United States Patent
Okada (10) Patent No.: US 8,819,147 B2
(45) Date of Patent: Aug. 26, 2014

(54) ELECTRONIC MAIL RECEIVING APPARATUS

(75) Inventor: Kazuhiro Okada, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 544 days.

(21) Appl. No.: 12/370,990

(22) Filed: Feb. 13, 2009

(65) Prior Publication Data

US 2009/0254622 A1    Oct. 8, 2009

(30) Foreign Application Priority Data

Apr. 4, 2008   (JP) .................. 2008-098161

(51) Int. Cl.
*G06F 15/16* (2006.01)
*H04L 12/58* (2006.01)

(52) U.S. Cl.
CPC .............. *H04L 12/58* (2013.01); *H04L 51/28* (2013.01); *H04L 51/22* (2013.01); *H04L 51/30* (2013.01)
USPC ............................ 709/206; 709/203; 709/216

(58) Field of Classification Search
CPC ................ H04L 51/22; H04L 12/58
USPC ......................................... 709/216
See application file for complete search history.

(56) References Cited

U.S. PATENT DOCUMENTS

| | | | |
|---|---|---|---|
| 7,293,171 B2 * | 11/2007 | Batthish et al. | 709/206 |
| 2006/0010322 A1 * | 1/2006 | Novack et al. | 713/170 |
| 2007/0198662 A1 * | 8/2007 | Parham et al. | 709/219 |
| 2008/0162933 A1 | 7/2008 | Okada | |

FOREIGN PATENT DOCUMENTS

| | | |
|---|---|---|
| JP | 2001-308906 A | 11/2001 |
| JP | 2004-341986 A | 12/2004 |
| JP | 2005-092805 A | 4/2005 |
| JP | 2005-128672 A | 5/2005 |
| JP | 2005-244646 A | 9/2005 |
| JP | 2006-270353 A | 10/2006 |
| JP | 2008-124821 A | 5/2008 |
| JP | 2008-165307 A | 7/2008 |
| WO | 2008/116419 A1 | 10/2008 |

OTHER PUBLICATIONS

Mochizuki: "Electronic Mail Gateway Apparatus," U.S. Appl. No. 12/400,020, filed Mar. 9, 2009.
Official Communication issued in corresponding Japanese Patent Application No. 2008-098161, mailed on Mar. 30, 2010.

* cited by examiner

*Primary Examiner* — Patrice Winder
*Assistant Examiner* — Nam Tran
(74) *Attorney, Agent, or Firm* — Keating & Bennett, LLP (57) ABSTRACT

In an e-mail receiving apparatus, a user management table arranged to include each combination of a user ID that is used for identifying a plurality of users and a unique ID that is newly set each time a new user is registered in an S/MIME gateway apparatus. A received e-mail management table is arranged to include a plurality of records each indicating an association relation between each e-mail received from an e-mail server apparatus, and the user ID and the unique ID of a destination user of the corresponding e-mail. A main control unit is arranged to read out each record of the received e-mail management table, determine whether or not the unique ID related to the read-out record is in the user management table, and delete the read-out record from the received e-mail management table when the unique ID is not in the user management table. Accordingly, a system is provided in which, when a registration of a user of a distribution destination is deleted, received e-mails are properly processed.

11 Claims, 12 Drawing Sheets

EACH RECORD OF RECEIVED E-MAIL MANAGEMENT TABLE 2t

| ITEM | CONTENTS |
|---|---|
| MANAGEMENT NUMBER | INTEGER VALUE |
| STATUS | STATUS INDICATING "AVAILABLE", "RESERVED", "ALREADY RECEIVED", "CURRENTLY PROCESSED" OR "ALREADY PROCESSED" |
| START TIME | START TIME OF A SESSION |
| RECEIPT TIME | RECEIPT TIME OF E-MAIL |
| RECEIVING METHOD | RECEIVING METHOD THROUGH POP3 OR SMTP |
| RESULT CODE | SUCCESSFUL OR ERROR (SUCH AS CONNECTION ERROR AND TIME-OUT ERROR, ETC.) |
| USER ID | UNIQUE ID AND USER ID |
| MESSAGE ID | E-MAIL MESSAGE ID |
| FILE PATH | PATH OF FILE IN WHICH OTHER PRESCRIBED ADDITIONAL INFORMATION IS STORED (PATH OF FILE IN WHICH TRANSMISSION SOURCE ADDRESS AND TRANSMISSION DESTINATION ADDRESS ARE STORED OR PATH OF E-MAIL HEADER FILE) |

FIG. 6

USER MANAGEMENT TABLE 3t

| USER MANAGEMENT DATA | | |
|---|---|---|
| USER ID | UNIQUE ID | USER NAME |
| 1 | 00....001 | A1 |
| 2 | 00....010 | A2 |
| 3 | 00....100 | A3 |
| ⋮ | ⋮ | ⋮ |

ELECTRONIC MAIL RECEIVING APPARATUS

CROSS-REFERENCE TO RELATED APPLICATIONS

This application claims priority under 35 U.S.C. 119 to Japanese Patent Application No. 2008-098161, filed on Apr. 4, 2008, which application is hereby incorporated by reference in its entirety.

BACKGROUND OF THE INVENTION

1. Field of the Invention

The present invention relates to an electronic mail (e-mail) receiving apparatus and, in particular, to an e-mail receiving apparatus arranged to receive e-mails addressed to a plurality of users from an e-mail server apparatus and to distribute each of the received e-mails to each of the corresponding users.

2. Description of the Related Art

A known e-mail management apparatus includes a received information management unit having a received e-mail ID management file in which a received e-mail ID of an e-mail addressed to a user of a receiving party is stored with respect to each user of the receiving party; a received e-mail ID extracting unit arranged to refer to the received e-mail ID management file when an e-mail reception request is made by the user of the receiving party and to extract the received e-mail ID of the user of the receiving party; and an e-mail data reading-out and transmitting unit arranged to read out e-mail data from an e-mail data storage unit based on the received e-mail ID extracted through the received e-mail ID extracting unit and to transmit the e-mail data to the user of the receiving party.

Another known communication terminal apparatus in the conventional art can receive e-mails and includes a detection unit arranged to detect a destination type of an address of the communication terminal apparatus, the address being included in a received e-mail; a setting unit arranged to set a process with respect to the received e-mail in association with the detected destination type; and a control unit arranged to execute the set process in accordance with the detected destination type.

However, in such e-mail receiving apparatuses in the conventional art, it is necessary to sequentially process the received e-mails when managing the received e-mail as a queue (waiting line). Accordingly, if a registration of a user of an e-mail destination is deleted from the e-mail receiving apparatus, a problem exists in that the process with respect to the e-mail cannot be completed and a process with respect to subsequent e-mails cannot be performed.

SUMMARY OF THE INVENTION

In order to overcome the problems described above, preferred embodiments of the present invention provide an e-mail receiving apparatus arranged to properly process received e-mails even when a registration of a user of a distribution destination is deleted.

According to a preferred embodiment of the present invention, an e-mail receiving apparatus is arranged to perform prescribed processes on e-mails that are received from an e-mail server apparatus and are addressed to a plurality of users, and to include a control unit arranged to distribute the e-mails to the plurality of users by storing the processed e-mails in a mail box that is provided as a first storage unit with respect to each user. The e-mail receiving apparatus includes a second storage unit arranged to store: (1) a user management table having each combination of a unique ID, which is newly set each time a new user is registered in the e-mail receiving apparatus, and setting information of the plurality of users, and (2) a received e-mail management table having a plurality of records each indicating a relation between each e-mail, and the setting information and the unique ID of a destination user of the corresponding e-mail. In such an e-mail receiving apparatus, in response to a command having ability to delete a registration of a certain user, the control unit deletes e-mails addressed to the certain user from the first storage unit, deletes the combination of the setting information and the unique ID of the certain user from the user management table, reads out each record of the received e-mail management table, determines whether or not the unique ID of the user related to the read-out record is in the user management table, performs the prescribed process on the stored e-mail(s) that is related to the read-out record when the unique ID is in the user management table, and deletes the read-out record and the corresponding e-mail(s) from the received e-mail management table when the corresponding combination is not in the user management table.

In the above-described e-mail receiving apparatus, the plurality of e-mails that are received from the e-mail server apparatus preferably are encrypted e-mails, and the prescribed process preferably includes a decryption process in which the encrypted e-mails are decrypted into plain text e-mails.

According to a preferred embodiment of the present invention, an e-mail receiving apparatus is arranged to perform prescribed processes on e-mails that are received from an e-mail server apparatus and are addressed to a plurality of users, and to include a control unit arranged to distribute the e-mails to the plurality of users by storing the processed e-mails in a mail box that is provided as a first storage unit with respect to each user. The e-mail receiving apparatus includes a second storage unit arranged to store: (1) a user management table having each combination of a unique ID, which is newly set each time a new user is registered in the e-mail receiving apparatus, and setting information of the plurality of users, and (2) a received e-mail management table having a plurality of records each indicating a relation between each e-mail, and the setting information and the unique ID of a destination user of the corresponding e-mail. In such an e-mail receiving apparatus, in response to a command having ability to delete a registration of a certain user, the control unit deletes e-mails addressed to the certain user from the first storage unit and deletes the combination of the setting information and the unique ID of the certain user from the user management table. Further, the control unit reads out each record of the received e-mail management table, determines whether or not the unique ID of the user related to the read-out record is in the user management table, performs the prescribed process on the stored e-mail(s) that is related to the read-out record when the unique ID is in the user management table, and deletes the read-out record and the corresponding e-mail (s) from the received e-mail management table when the corresponding combination is not in the user management table. Thus, even when a registration of a certain user is deleted after the e-mails addressed to the plurality of users are received from the e-mail server apparatus, the e-mails addressed to the users other than the deleted user can be properly processed.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will now be described with reference to the drawings. Like elements are given like reference characters in each of the following preferred embodiments.

Figure 1:
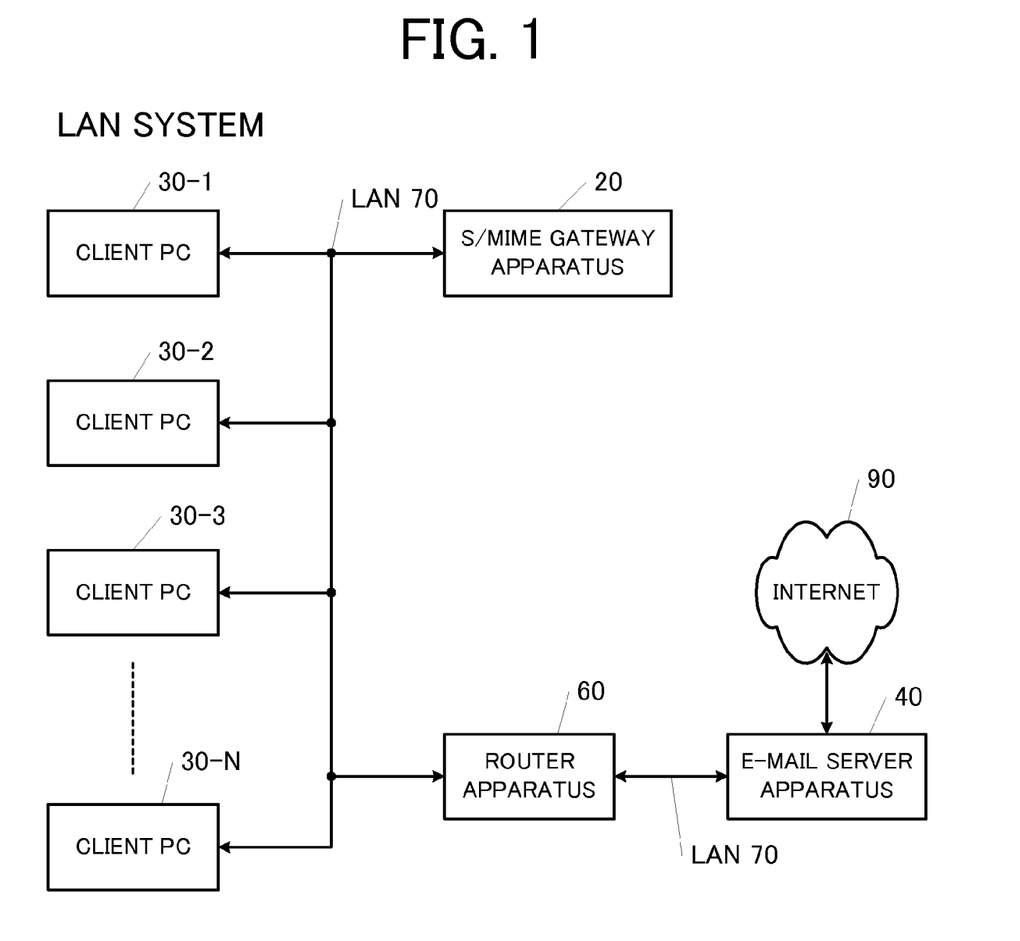
FIG. 1 is a block diagram illustrating a configuration of a Local Area Network (LAN) system including a Secure Multipurpose Internet Mail Extensions (S/MIME) gateway apparatus 20 with an e-mail transmitting/receiving function using S/MIME according to a preferred embodiment of the present invention.

FIG. 1 is a block diagram illustrating a configuration of a LAN system including an S/MIME gateway apparatus 20 with an e-mail transmitting/receiving function using S/MIME according to a preferred embodiment of the present invention.

Figure 2:
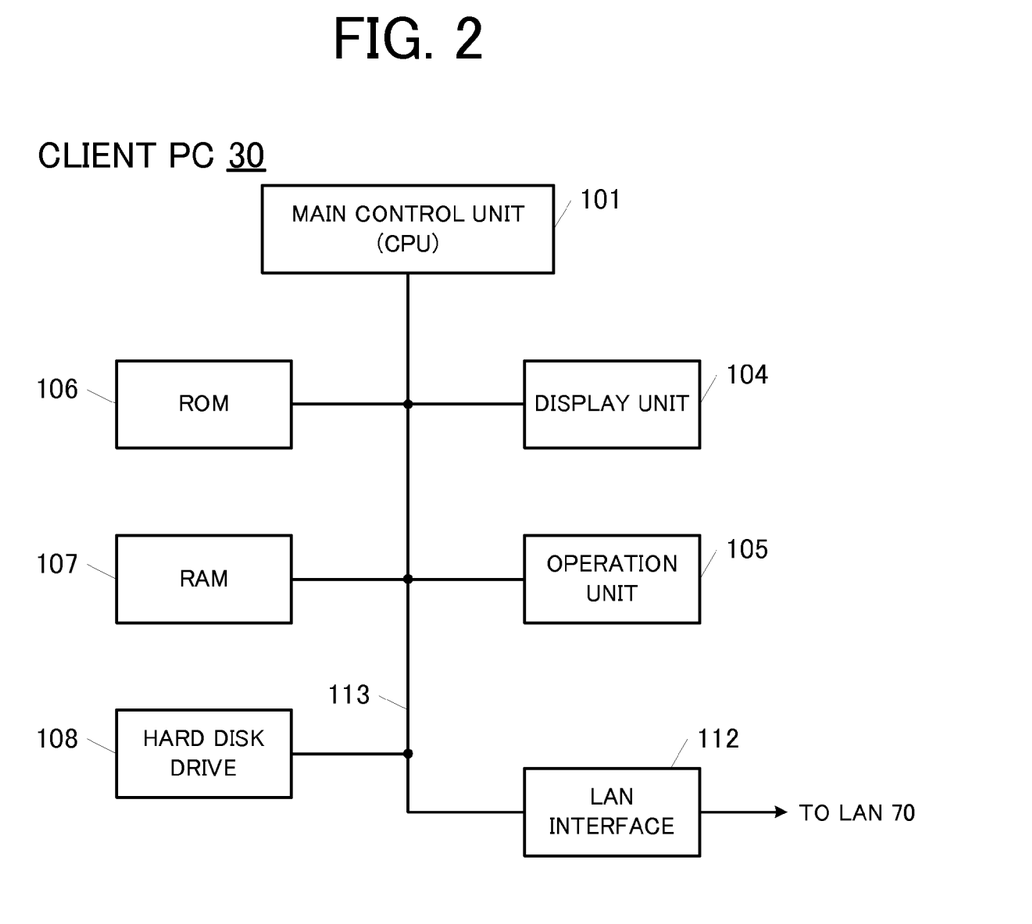
FIG. 2 is a block diagram illustrating a configuration of a client personal computer (PC) 30 of FIG. 1 according to a preferred embodiment of the present invention.
Figure 3:
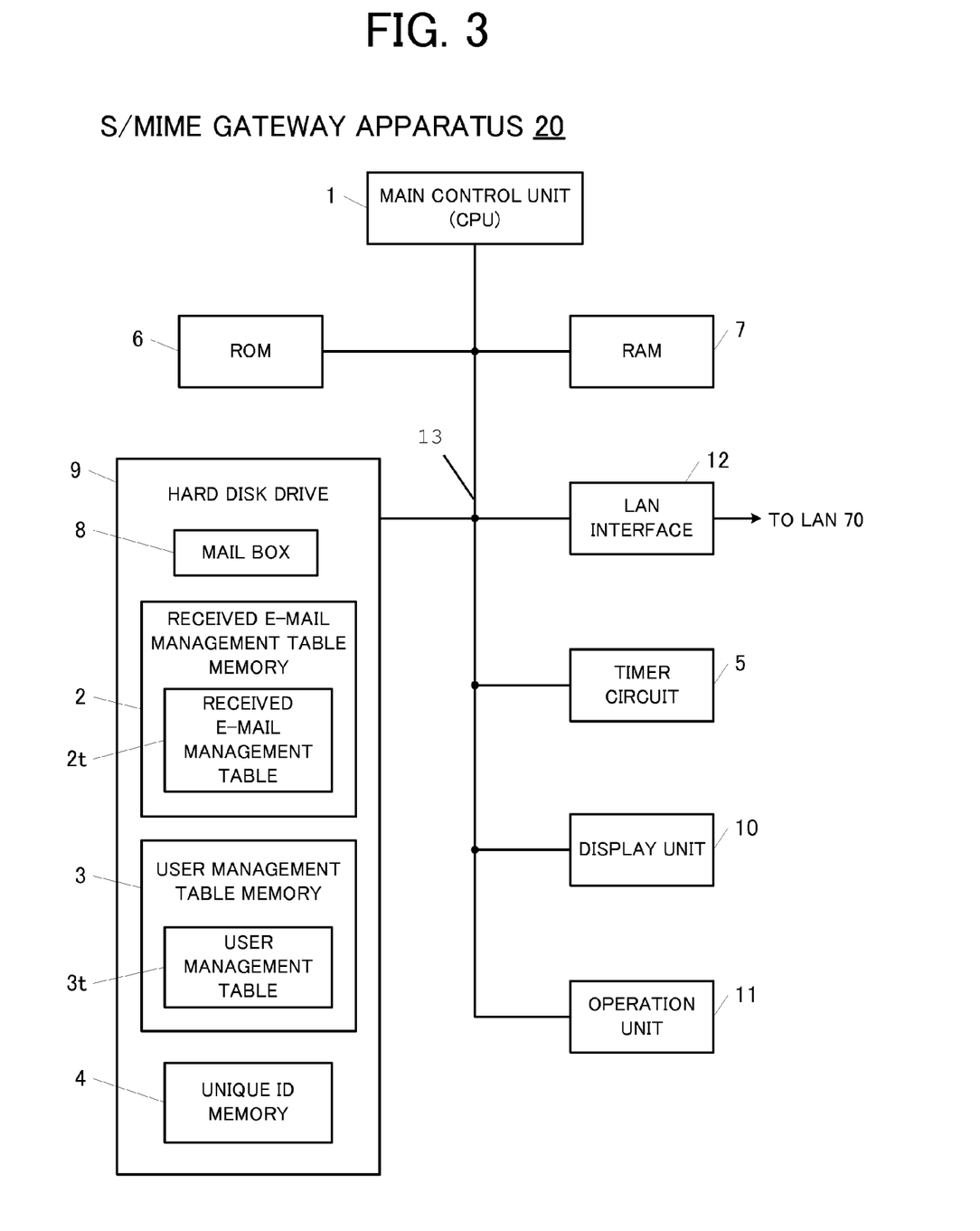
FIG. 3 is a block diagram illustrating a configuration of the S/MIME gateway apparatus 20 of FIG. 1.
Figure 4:
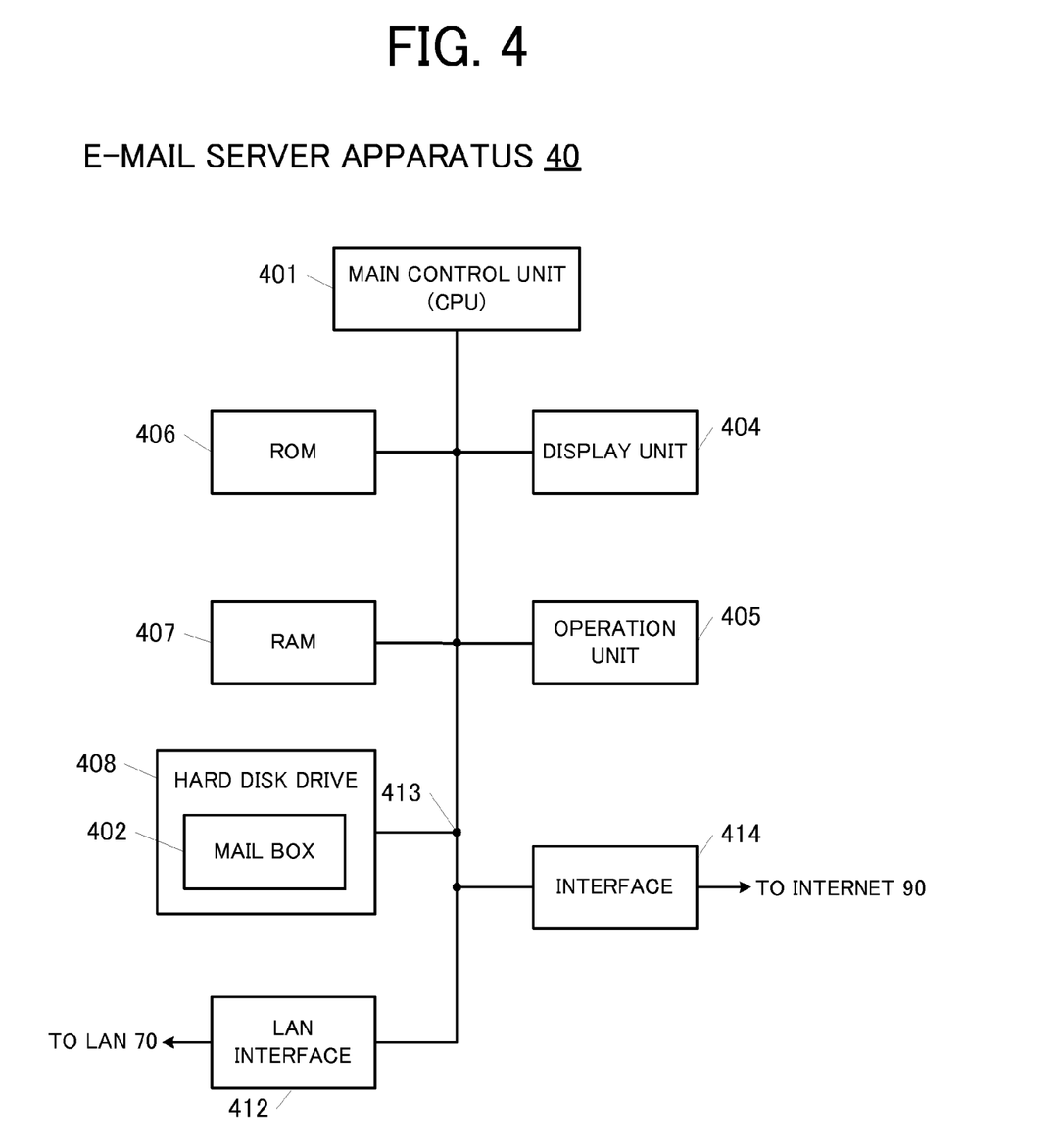
FIG. 4 is a block diagram illustrating a configuration of an e-mail server apparatus 40 of FIG. 1.

According to the present preferred embodiment, a plurality of client PCs 30-1 through 30-N (hereinafter, collectively referred to as the client PC 30), the S/MIME gateway apparatus 20, a router apparatus 60, and an e-mail server apparatus 40 connected to the Internet 90 are connected via a LAN 70 in the LAN system. FIG. 2 is a block diagram illustrating a configuration of the client PC 30 of FIG. 1. FIG. 3 is a block diagram illustrating a configuration of the S/MIME gateway apparatus 20 of FIG. 1. FIG. 4 is a block diagram illustrating a configuration of the e-mail server apparatus 40 of FIG. 1.

Each client PC 30 can encrypt e-mails through S/MIME and then transmit/receive the e-mails by being connected with the e-mail server apparatus 40 via the S/MIME gateway apparatus 20 and the router apparatus 60.

With reference to FIG. 2, the configuration of the client PC 30 will now be described.

In FIG. 2, the client PC 30 executes processes of generating, recording, storing, transmitting, and receiving plain text e-mails, image data, and character data, for example. In the present preferred embodiment, the client PC 30 is preferably used as a user's terminal apparatus arranged to transmit/receive the generated plain text e-mails to/from the S/MIME gateway apparatus 20. An e-mail transmission/reception program of the client PC 30 is preferably stored in a hard disk drive 108 of the client PC 30 in advance. The e-mail transmission/reception program defines a well-known control program that is used to generate e-mails and to transmit/receive the e-mails via the S/MIME gateway apparatus 20. In an e-mail transmitting/receiving function of the client PC 30, the generated plain text e-mails are transmitted to the S/MIME gateway apparatus 20. The client PC 30 transmits a first e-mail-reception-requesting command, which is issued to request e-mail reception, to the S/MIME gateway apparatus 20 and receives a plain text e-mail that is transmitted from the S/MIME gateway apparatus 20 in response to such a command. The first e-mail-reception-requesting command is issued at prescribed time intervals or in accordance with a prescribed instruction command that is input via an operation unit 105 by a user of the PC 30 in order to instruct the PC 30 to receive e-mails.

A main control unit 101 preferably includes a Central Processing Unit (CPU), is connected to each of the following hardware via a bus 113, controls such hardware, and executes functions of various software packages. A display unit 104 defines a Liquid Crystal Display (LCD) or a Cathode Ray Tube (CRT) display, for example. The display unit 104 preferably displays an operational state of the client PC 30, the e-mails to be transmitted, and the received e-mails, for example. The operation unit 105 defines a keyboard, for example, and is used to input the instruction command that is issued to receive character data and the e-mails, for example.

A Read Only Memory (ROM) 106 is preferably arranged to store, in advance, programs of various software that are necessary for operations of the client PC 30 and are executed through the main control unit 101. A Random Access Memory (RAM) 107 preferably includes a Static RAM (SRAM), a Dynamic RAM (DRAM), and a Synchronous DRAM (SDRAM), for example, and is arranged to be used as a working area of the main control unit 101 and to store temporal data that is generated at the time of program execution. The hard disk drive 108 defines a storage unit to which a recording medium is inserted, and is preferably arranged to store application programs to be executed and an image memory. In the present preferred embodiment, the hard disk drive 108 is arranged to store the e-mail transmission/reception program of the client PC 30. A LAN interface 112 is preferably connected with the LAN 70, receives signals and data from the LAN 70, and transmits signals and data to the LAN 70, in order to execute interface processes related to LAN communication such as signal conversion and protocol conversion.

Next, the configuration of the S/MIME gateway apparatus 20 will be described with reference to FIG. 3.

The S/MIME gateway apparatus 20 includes an e-mail transmitting/receiving function implemented to transmit/receive e-mails of a user that is registered in the S/MIME gateway apparatus 20. In the e-mail transmitting/receiving function of the S/MIME gateway apparatus 20, plain text e-mails received from each of the plurality of client PCs 30 are transmitted to the e-mail server apparatus 40 after having an electronic signature process and an encryption process performed on through software in accordance with S/MIME. Then, a second e-mail-reception-requesting command that is issued to request transmission of e-mails addressed to the plurality of users (i.e., users of the client PCs 30) registered in the S/MIME gateway apparatus 20 is generated, and then transmitted to the e-mail server apparatus 40. After having an electronic signature validating process and a decryption process performed through software in accordance with S/MIME, encrypted e-mails each having an electronic signature received from the e-mail server apparatus 40 in response to such a command are converted into plain text e-mails and stored in a mail box 8 of each user. Further, the e-mails stored in the mail box 8 of each user are distributed to the corresponding client PCs 30 in response to the first e-mail-reception-requesting command transmitted from each client PC 30. In other words, the S/MIME gateway apparatus 20 functions as a Simple Mail Transfer Protocol (SMTP) server apparatus and a Post Office Protocol Ver. 3 (POP3) server apparatus for each client PC 30, and as an SMTP client apparatus and a POP3 client apparatus for the e-mail server apparatus 40.

In the S/MIME gateway apparatus 20, a main control unit 1 preferably including a CPU, is connected to each of the following hardware via a bus 13, controls such hardware, and executes functions of various software to be described later. A ROM 6 is preferably arranged to store, in advance, various software programs such as a Basic Input/Output System that are necessary for an operation of activating the S/MIME gateway apparatus 20, for example, and are executed through the main control unit 1. A RAM 7 preferably includes an SRAM, a DRAM, and an SDRAM, for example, and is arranged to be used as a working area of the main control unit 1 and to store temporal data that is generated at the time of program execution.

A hard disk drive 9 defines a storage unit in which a recording medium is inserted, and is preferably arranged to store various data and programs. In the present preferred embodiment, the hard disk drive 9 preferably includes at least each program of a new user registration process (FIG. 7), a received e-mail management table updating process (FIG. 8), a received e-mail managing process (FIG. 9), and a user registration deleting process (FIG. 10) of the S/MIME gateway apparatus 20. The hard disk drive 9 preferably includes the mail box 8; a received e-mail management table memory 2 arranged to store a received e-mail management table 2*t* to be described later in detail with reference to FIG. 5; a user management table memory 3 arranged to store a user management table 3*t* to be described later in detail with reference to FIG. 6; and a unique ID memory 4 to be described later in detail. The mail box 8 includes a plurality of mail boxes that are allotted to the respective users in order to store, with respect to each user registered in the S/MIME gateway apparatus 20, the plain text e-mails obtained by performing the decryption process and the signature validating process on the encrypted e-mails received from the e-mail server apparatus 40.

A LAN interface 12 is connected to the LAN 70, receives signals and data from the LAN 70, and transmits signals and data to the LAN 70, in order to execute interface processes related to LAN communication such as signal conversion and protocol conversion. A timer circuit 5 is preferably used to generate the second e-mail-reception-requesting command every prescribed period of time-out. When the prescribed period of time-out (for example, ten minutes) elapses since a reset, the timer circuit 5 transmits a control signal indicating a time-out to the main control unit 1. A display unit 10 defines an LCD, or a CRT display, for example, and displays an operational state of the S/MIME gateway apparatus 20, for example. An operation unit 11 defines a keyboard and a mouse, for example, and is used to input character data and instruction commands or the like.

Figure 6:
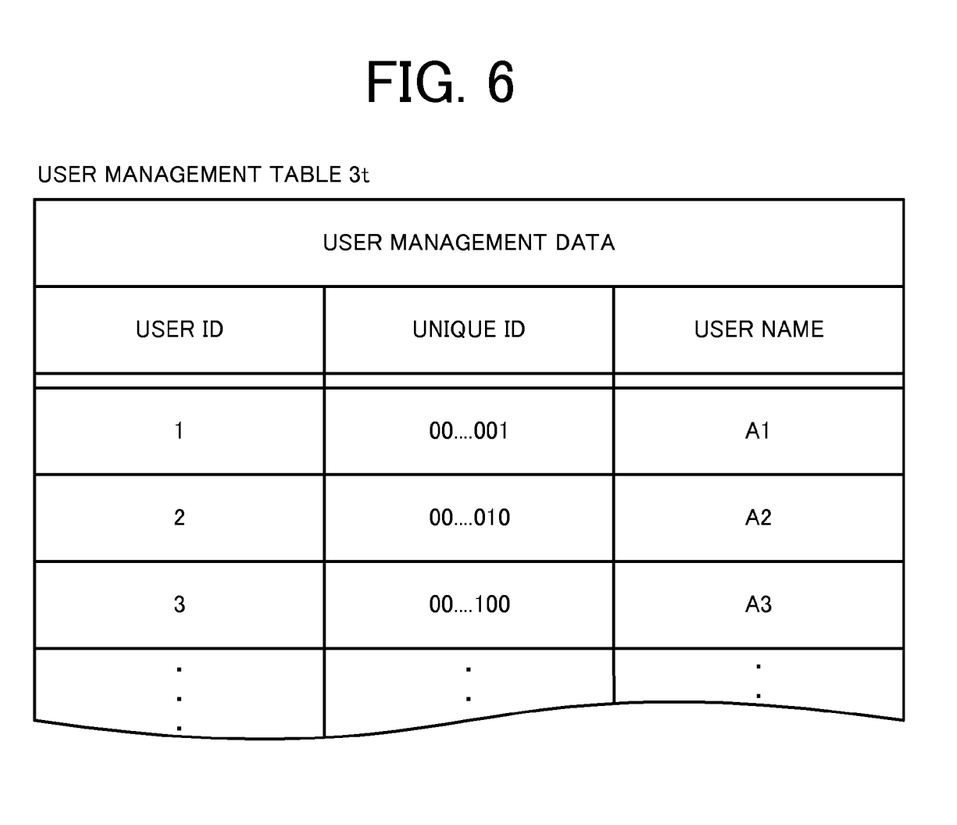
FIG. 6 is an example of a user management table 3t of FIG. 3.

FIG. 6 is an example of the user management table 3*t* of FIG. 3. As illustrated in FIG. 6, user management data including a user ID, a unique ID, and a user name of a user is written to the user management table 3*t* with respect to each user registered in the S/MIME gateway apparatus 20. The user ID and the user name are used as setting information for identifying the plurality of users registered in the user management table 3*t*. The user ID preferably includes an integer value, which is input by the user, and is identical to a POP3 user ID that is used for receiving the e-mails from the e-mail server apparatus 40. The user name preferably includes a character string having an alphameric character. When a registration of a user having a certain user ID is deleted from the user management table 3*t*, the certain user ID and a corresponding user name may be allotted to another new user. The unique ID includes a 32-bit value that is incremented each time a new user is registered in the user management table 3*t*. The unique ID of a last user to be registered is stored in the unique ID memory 4. A new user registration in the user management table 3*t* is performed through the new user registration process to be described later with reference to FIG. 7. A user registration deletion from the user management table 3*t* is performed through the user registration deleting process to be described later in detail with reference to FIG. 10.

Figure 5:
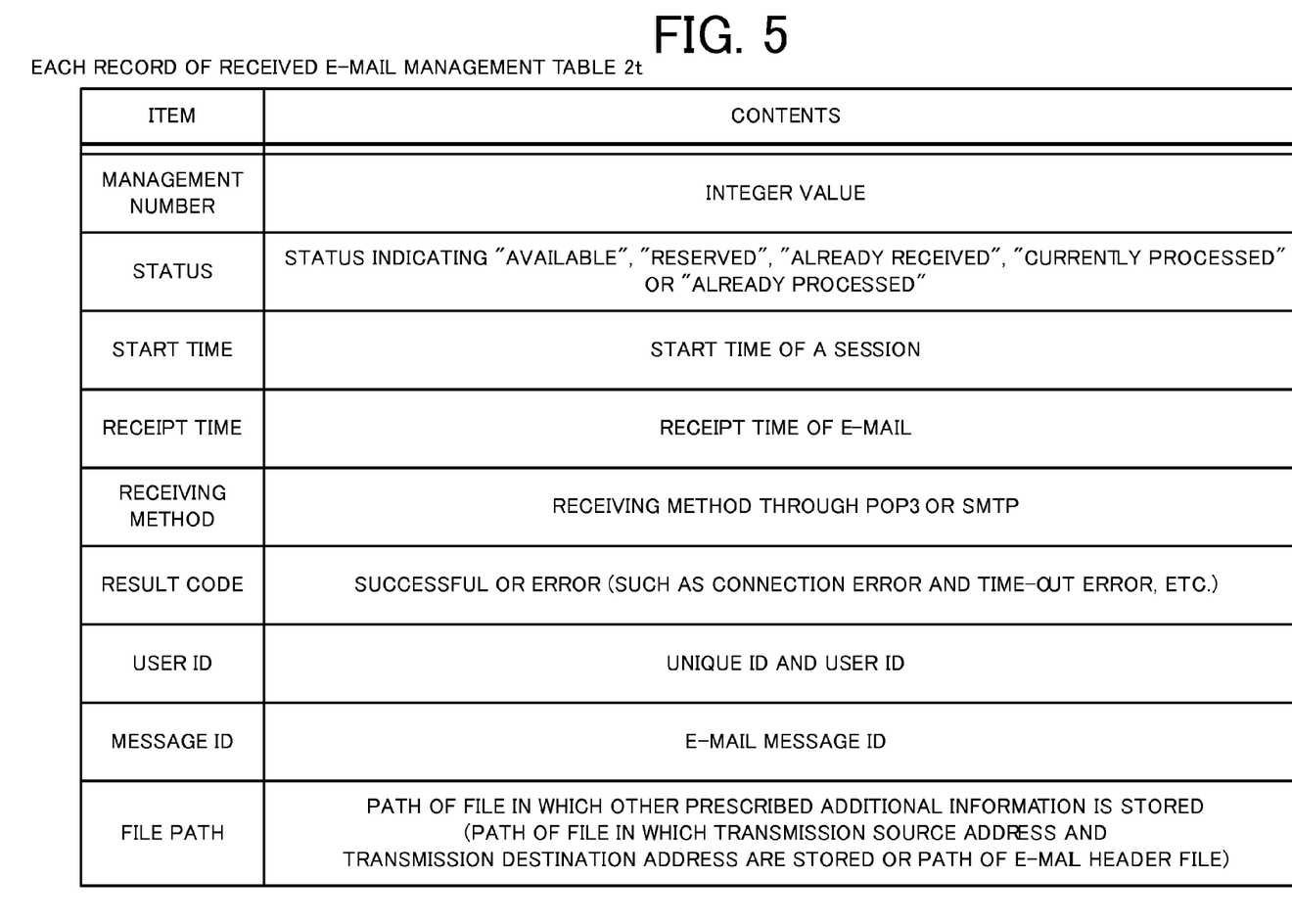
FIG. 5 is an example of items and contents of received e-mail management data that is written to each record of a received e-mail management table 2t of FIG. 3.

FIG. 5 is an example of items and contents of received e-mail management data written to each record of the received e-mail management table 2*t* of FIG. 3. The received e-mail management table 2*t* is used to temporarily manage, as a queue, each e-mail addressed to the plurality of users, which e-mails are received from the e-mail server apparatus 40. The received e-mail management table 2*t* includes a plurality of records each representing the relation between each e-mail, and the corresponding user ID and unique ID of the recipient user. As illustrated in FIG. 5, the received e-mail management data written to each record includes a management number having an integer value, a record status, a start time of a session related to the corresponding record, a receipt time of the e-mail of the corresponding record, a receiving method indicating whether the e-mail is received through POP3 or SMTP, a result code indicating a distribution result of the e-mail, a user ID and a unique ID of a user of the e-mail distribution destination, a message ID of the e-mail, and a file path related to the e-mail. Here, the record status includes: (a) a status indicating that the corresponding record is not used (i.e., that the corresponding record is available); (b) a status indicating that the corresponding record is reserved; (c) a status indicating that an e-mail related to the corresponding record has already been received; (d) a status indicating that the e-mail related to the corresponding record is currently being processed; and (e) a status indicating that the e-mail related to the corresponding record has already been processed. The result code indicates whether the distribution of the e-mail has been successful or an error such as a connection error or a time-out error, for example, has occurred during the distribution. The file path indicates a path of a file in which additional information about the e-mail is stored, such as a path of a file in which each address of a transmission source and a transmission destination of the e-mail is written, and a path of a header file in which a header of the e-mail is stored, for example. The received e-mail management table is preferably arranged to store actual data of the e-mail as an item of the table or to store information indicating a location of the e-mail that is stored in another area.

A configuration of the e-mail server apparatus 40 will be described with reference to FIG. 4.

In FIG. 4, the e-mail server apparatus 40 defines a well-known SMTP e-mail server apparatus or a POP3 e-mail server apparatus, for example, and executes an e-mail transmitting/receiving process. The e-mail server apparatus 40 is preferably arranged to transmit the encrypted e-mails each having the electronic signature that are received from the S/MIME gateway apparatus 20 to another e-mail server apparatus (not illustrated) via the Internet 90. Moreover, the e-mail server apparatus 40 is preferably arranged to store encrypted e-mails each having an electronic signature received from another e-mail server apparatus in a mail box 402. Further, in response to the second e-mail-reception-requesting command from the S/MIME gateway apparatus 20, the e-mail server apparatus 40 transmits the e-mail addressed to the user registered in the S/MIME gateway apparatus 20 to the S/MIME gateway apparatus 20. An e-mail transmission/reception program of the e-mail server apparatus 40 is preferably stored in a hard disk drive 408 in advance. The e-mail transmission/reception program defines a well-known control program that is used to transmit/receive encrypted e-mails each having an electronic signature to/from the S/MIME gateway apparatus 20.

A main control unit 401 preferably includes a CPU, is connected to each of the following hardware via a bus 413, controls such hardware, and executes functions of various software. A display unit 404 preferably includes an LCD or a CRT display, for example, and displays an operational state of the e-mail server apparatus 40. An operation unit 405 preferably includes a keyboard, for example, and is used to input character data and instruction commands, for example.

A ROM 406 is preferably arranged to store, in advance, programs of various software that are necessary for operations of the e-mail server apparatus 40 and are executed through the main control unit 401. A RAM 407 preferably includes an SRAM, a DRAM, and an SDRAM, for example, and is preferably arranged to be used as a working area of the main control unit 401 and to store temporal data that is generated at the time of program execution. The hard disk drive 408 defines a storage unit to which a recording medium is inserted, and is preferably arranged to store application programs to be executed and an image memory. In the present preferred embodiment, the hard disk drive 408 is arranged to store the e-mail transmission/reception program as described above and to include the mail box 402. An interface 414 is preferably connected with the Internet 90, receives signals and data from the Internet 90, and transmits signals and data to the Internet 90, in order to execute interface processes related to Internet communication such as signal conversion and protocol conversion, for example. A LAN interface 412 is connected with the LAN 70, receives signals and data from the LAN 70, and transmits signals and data to the LAN 70, in order to execute interface processes related to LAN communication such as signal conversion and protocol conversion, for example.

Figure 7:
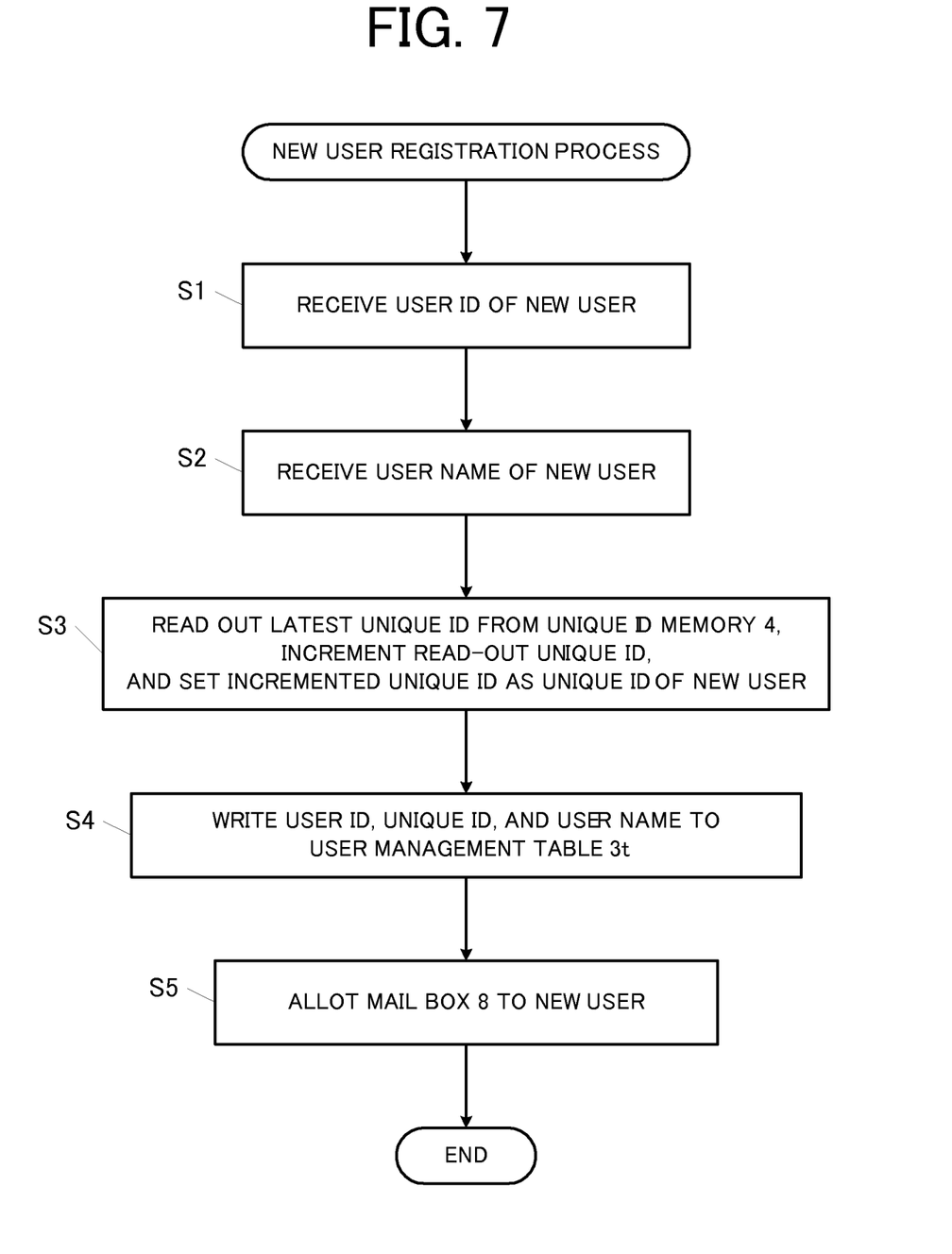
FIG. 7 is a flowchart representing a new user registration process executed through a main control unit 1 of the S/MIME gateway apparatus 20 of FIG. 3.

FIG. 7 is a flowchart representing the new user registration process executed through the main control unit 1 of the S/MIME gateway apparatus 20 of FIG. 3.

In FIG. 7, a user ID of a new user is received in step S1, and a user name of the new user is received in step S2. The user ID, a local IP address, and the user name of the new user are, for example, input by the new user through the keyboard, i.e., through the operation unit 11 of the S/MIME gateway apparatus 20. The user ID of the new user is set to include an integer value that is different from the user IDs of the other users that are registered in the user management table 3*t*. Then, in step S3, a latest unique ID is read out from the unique ID memory 4, incremented, and then set as the unique ID of the new user. In step S4, the user ID, the unique ID, and the user name are written to the user management table 3*t*. In step S5, a mail box 8 is allotted to the new user, and the new user registration process is ended.

As described above, through the new user registration process of FIG. 7, the user management table 3*t* is created, which specifies each combination of (1) the user ID indicating the setting information that is used to identify the plurality of users, and (2) the unique ID that is newly set each time a new user is registered in the S/MIME gateway apparatus 20.

Figure 8:
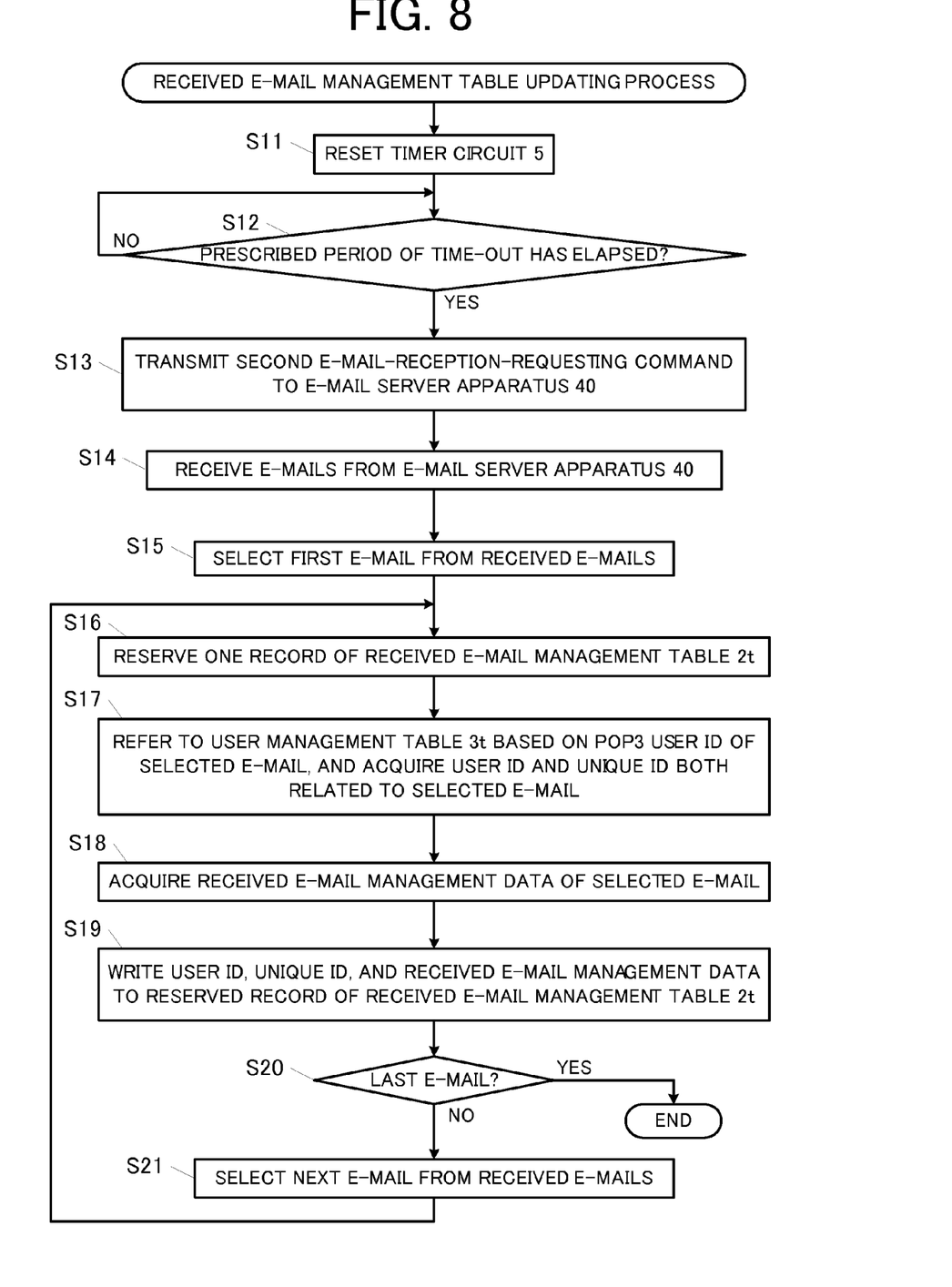
FIG. 8 is a flowchart representing a received e-mail management table updating process executed through the main control unit 1 of the S/MIME gateway apparatus 20 of FIG. 3.

FIG. 8 is a flowchart of the received e-mail management table updating process, which is executed through the main control unit 1 of the S/MIME gateway apparatus 20 of FIG. 3.

In FIG. 8, the timer circuit 5 is reset in step S11, and the process proceeds to step S12. In step S12, it is determined whether or not the prescribed period of time-out has elapsed, and whether or not a control signal indicating a time out has been received from the timer circuit 5. When the determination indicates "YES", the process proceeds to step S13. When the determination indicates "NO", the process of step S12 is repeated. In step S13, the second e-mail-reception-requesting command is transmitted to the e-mail server apparatus 40. Then, in step S14, the encrypted e-mails each having the electronic signature that are transmitted from the main control unit 401 of the e-mail server apparatus 40 in response to the second e-mail-reception-requesting command and are addressed to the client PCs 30 are received, and the process proceeds to step S15. In step S14, the S/MIME gateway apparatus 20 receives the e-mails addressed to the plurality of users registered in the user management table 3*t*.

In step S15, the first e-mail is selected from the e-mails that are received in step S14. One record of the received e-mail management table is reserved in step S16. Then, based on the POP3 user ID (which is identical to the user ID of the S/MIME gateway apparatus 20) of the selected e-mail, the user management table 3*t* is referred to, and the user ID and the unique ID of the selected e-mail are acquired in step S17. Further, in step S18, the received e-mail management data (refer to FIG. 5) of the selected e-mail is acquired. In step S19, the user ID, the unique ID, the received e-mail management data, the actual e-mail data, and position information thereof are written to the reserved record of the received e-mail management table 2*t*, and the process proceeds to step S20. In step S20, it is determined whether or not the e-mail that is currently selected from the e-mails received in step S14 is the last e-mail. If the determination indicates "YES", the received e-mail management table updating process is ended. If the determination indicates "NO", the process proceeds to step S21. In step S21, a next e-mail is selected from the e-mails received in step S14, and the process returns to step S16.

As described above, through the received e-mail management table updating process of FIG. 8, one record of the received e-mail management table 2*t* is reserved with respect to each e-mail received from the e-mail server apparatus 40. Then, the user ID and the unique ID of the destination user for the corresponding e-mail are written to the reserved record in association with each other. The received e-mail management table may store the actual data of the e-mail as one item of the table or may store information that indicates the location of the e-mail stored in the other area.

Figure 9:
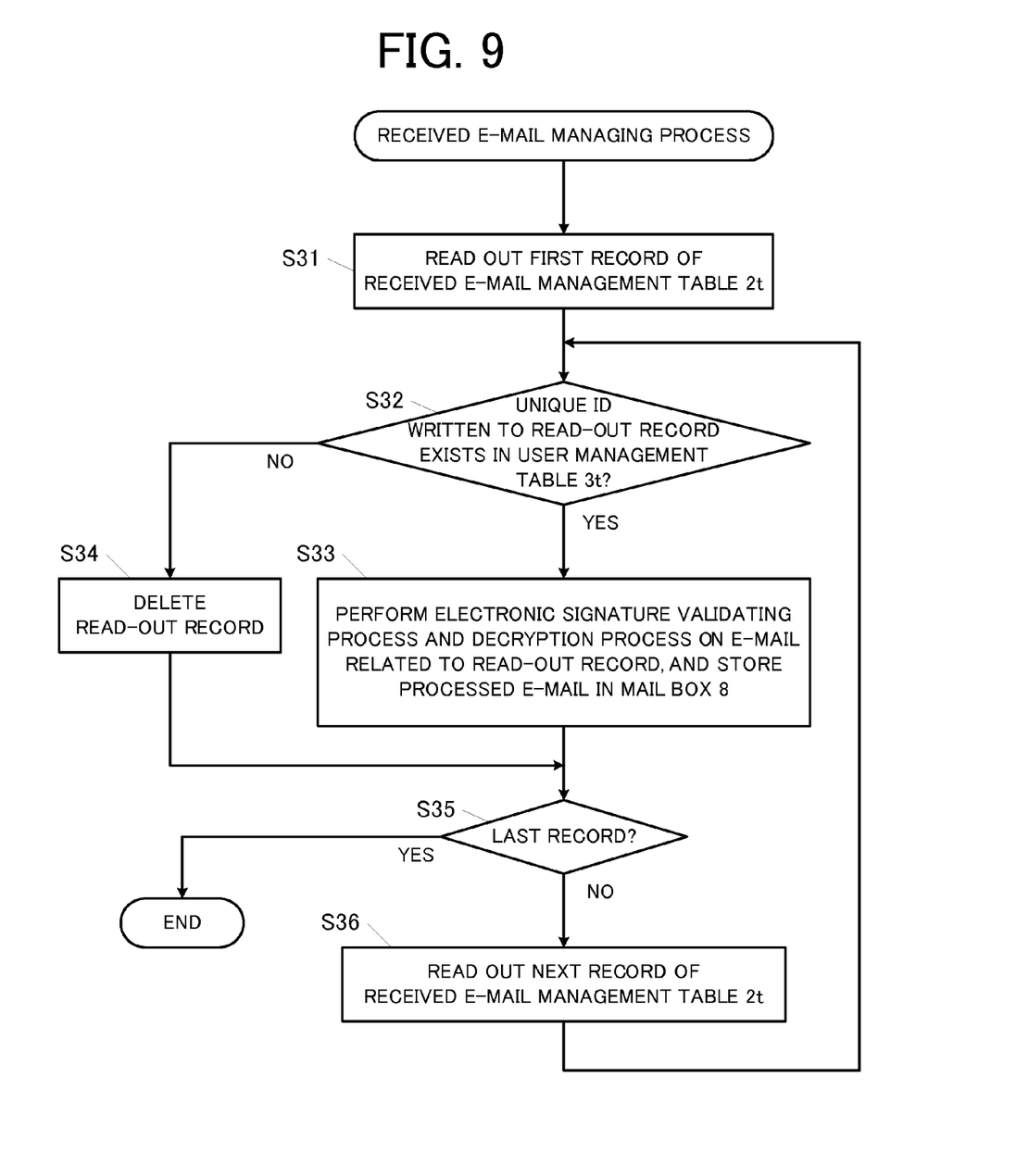
FIG. 9 is a flowchart representing a received e-mail managing process executed through the main control unit 1 of the S/MIME gateway apparatus 20 of FIG. 3.

FIG. 9 is a flowchart of the received e-mail managing process, which is executed through the main control unit 1 of the S/MIME gateway apparatus 20 of FIG. 3. The received e-mail managing process of FIG. 9 is executed at predetermined intervals independently of the received e-mail management table updating process.

In step S31 of FIG. 9, the first record of the received e-mail management table 2t is read out. It is determined in step S32 whether or not the unique ID written to the read-out record exists in the user management table 3t. If the determination indicates "YES" in step S32, the process proceeds to step S33, where the proper processes such as an electronic signature validating process and a decryption process, for example, are performed on the e-mail related to the read-out record. Then, the processed e-mail is stored in the mail box 8 that is allotted to the destination user of the e-mail, and the process proceeds to step S35. Meanwhile, if the determination of step S32 indicates "NO", the record and the actual data of the e-mail are deleted in step S34 by setting the status of the read-out record as available, and the process proceeds to step S35. It is determined in step S35 whether or not the next record is the last record. If the determination indicates "NO", the process proceeds to step S36, where the next record of the received e-mail management table 2t is read out, and the process returns to step S32. If the determination indicates "YES" in step S35, the received e-mail managing process is ended.

Figure 10:
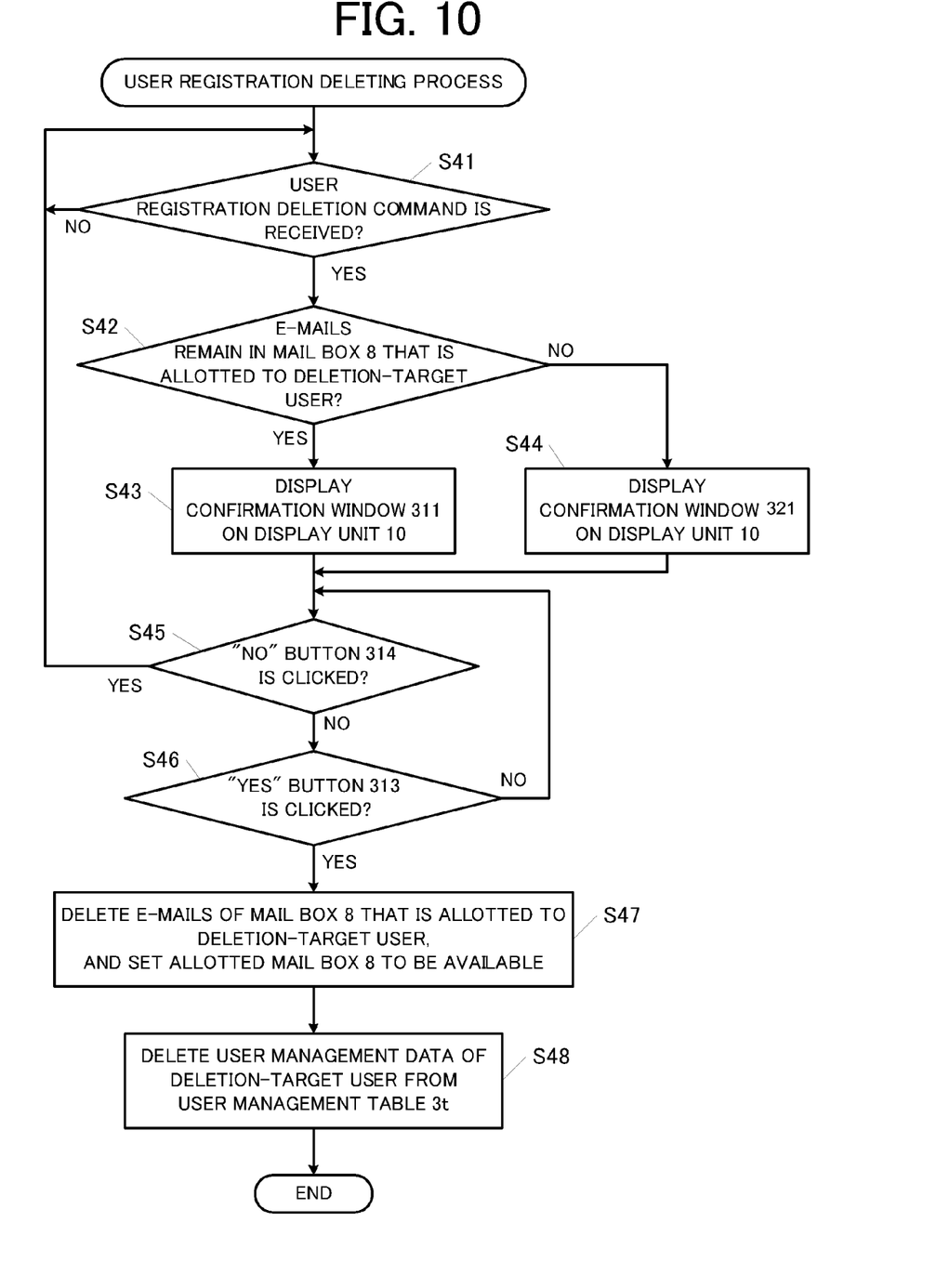
FIG. 10 is a flowchart representing a user registration deleting process executed through the main control unit 1 of the S/MIME gateway apparatus 20 of FIG. 3.

FIG. 10 is a flowchart of the user registration deleting process, which is executed through the main control unit 1 of the S/MIME gateway apparatus 20 of FIG. 3.

In step S41 of FIG. 10, it is determined whether or not a user registration deletion command having ability to delete a registration of a certain user has been received. If the determination indicates "YES", the process proceeds to step S42. If the determination indicates "NO", the process of step S41 is repeated. The user registration deletion command is input by the user, for example, through the operation unit 11 of the S/MIME gateway apparatus 20. Then, it is determined in step S42 whether or not any e-mail is in the mail box 8 that has been allotted to the user that will be deleted (hereinafter, referred to as the "deletion-target user").

Figure 11:
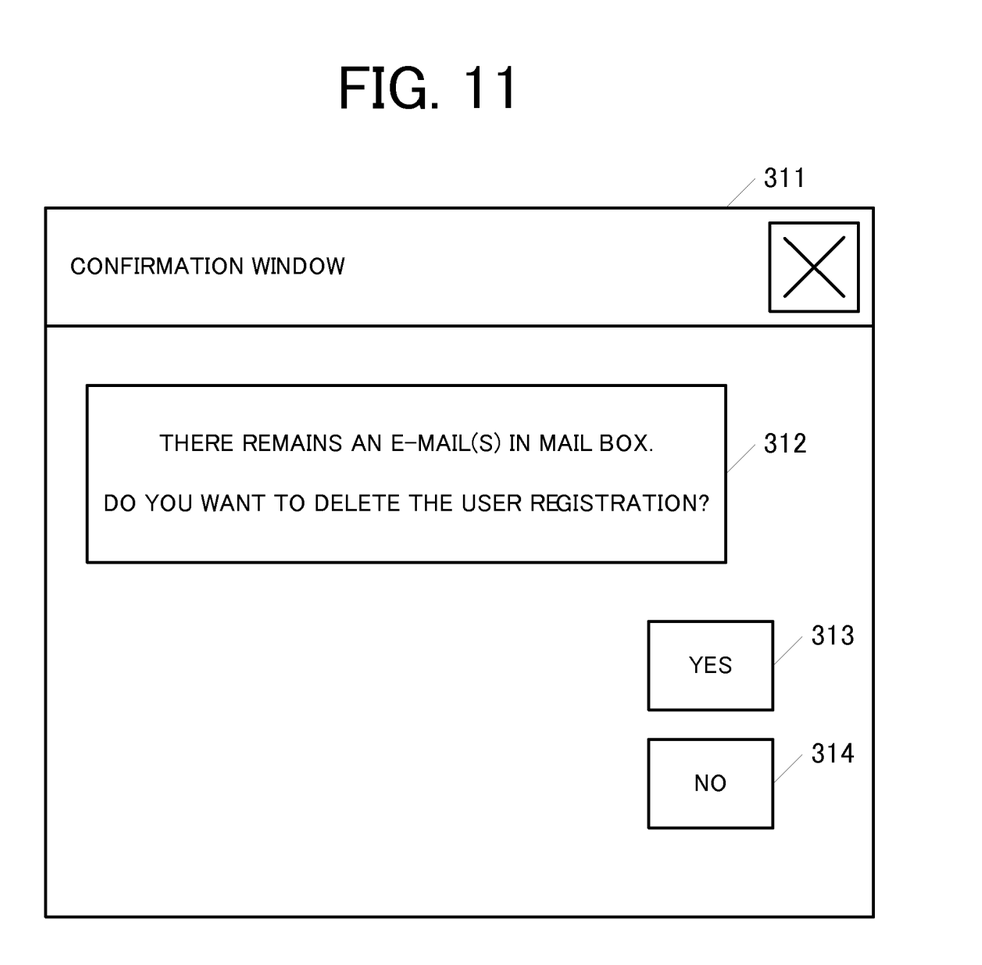
FIG. 11 is an example of a confirmation window 311 that is displayed in step S43 of FIG. 10 on a display unit 10 of the S/MIME gateway apparatus 20 of FIG. 3.
Figure 12:
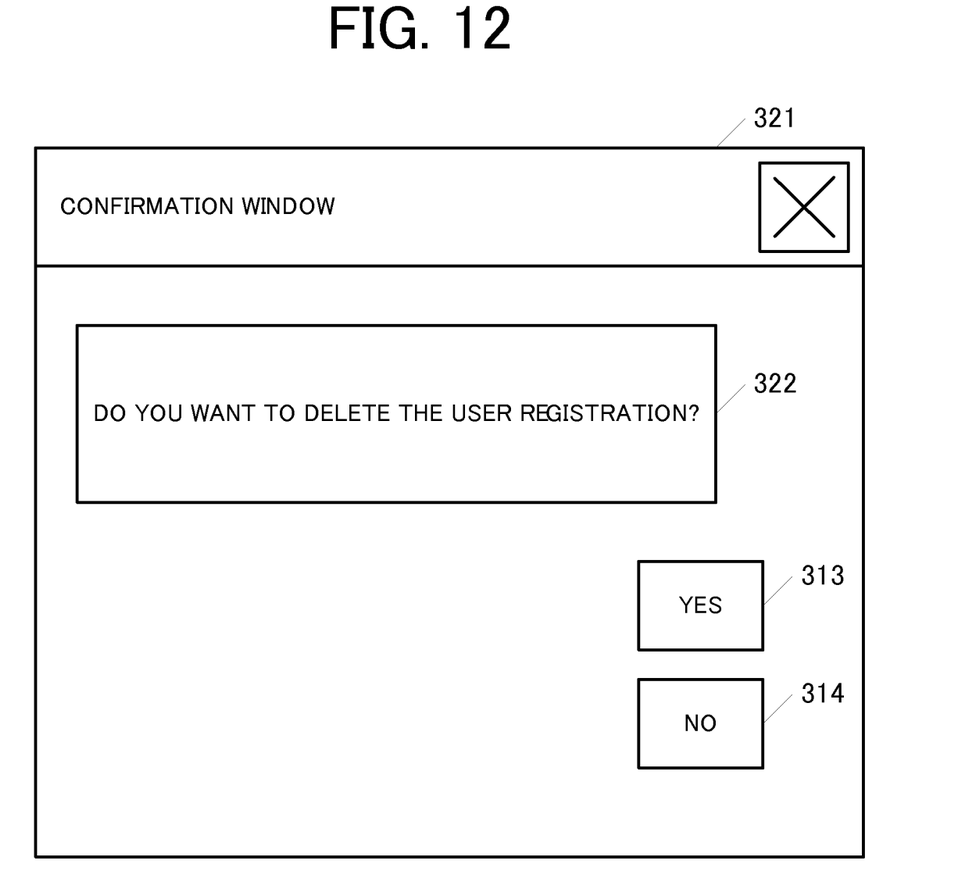
FIG. 12 is an example of a confirmation window 321 that is displayed in step S44 of FIG. 10 on the display unit 10 of the S/MIME gateway apparatus 20 of FIG. 3.

If the determination of step S42 indicates "YES", a confirmation window 311 is displayed on the display unit 10 of the S/MIME gateway apparatus 20 in step S43, and the process proceeds to step S45. FIG. 11 is an example of the confirmation window 311 displayed in step S43 of FIG. 10 on the display unit 10 of the S/MIME gateway apparatus of FIG. 3. As illustrated in FIG. 11, the confirmation window 311 includes a window 312 that displays the text "there remains an e-mail(s) in the mail box. Do you want to delete the user registration?"; a button 313 displaying the text "YES"; and a button 314 displaying the text "NO". If the determination of step S42 indicates "NO", a confirmation window 321 is displayed in step S44 on the display unit 10 of the S/MIME gateway apparatus 20, and the process proceeds to step S45. FIG. 12 is an example of the confirmation window 321 displayed on the display unit 10 of the S/MIME gateway apparatus 20 of FIG. 3 in step S44 of FIG. 10. As illustrated in FIG. 12, the confirmation window 321 includes a window 322 that displays the text "Do you want to delete the user registration?"; the button 313 displaying the text "YES"; and the button 314 displaying the text "NO".

It is determined in step S45 whether or not the "NO" button 314 is clicked. If the determination indicates "YES", the process returns to step S31. If the determination indicates "NO", the process proceeds to step S46. It is determined in step S46 whether or not the "YES" button 313 is clicked. If the determination indicates "YES", the process proceeds to step S47. If the determination indicates "NO", the process proceeds to step S45. In step S47, all e-mails in the mail box 8 that is allotted to the deletion-target user are deleted, and the allotted mail box becomes available. Then, the user management data of the deletion-target user is deleted from the user management table 3t in step S48, and the user registration deleting process is ended. Because the received e-mail management table is not updated in the user registration deleting process, an e-mail (s) for the deleted user may remain in the received e-mail management table.

As described above, the S/MIME gateway apparatus 20 of the present preferred embodiment includes the hard disk drive 9. The hard disk drive 9 is arranged to store (1) the user management table 3t including a combination of (a) the user ID that is used as the identification information for identifying the plurality of users and (b) the unique ID that is newly set each time a new user is registered in the S/MIME gateway apparatus 20, and (2) the received e-mail management table 2t including the plurality of records each indicating the association relation between each e-mail, and the user ID and unique ID of the destination user of the corresponding e-mail. In response to the user registration deletion command (in step S41 of FIG. 10), the main control unit 1 deletes the e-mails addressed to the deletion-target user from the mail box 8 (step S47 of FIG. 10) and the combination of the user ID and unique ID of the deletion-target user from the user management table 2t (step S48 of FIG. 10). Moreover, the main control unit 1 reads out each record of the received e-mail management table 2t (steps S31 and S36 of FIG. 9) and determines whether or not the unique ID related to the read-out record is in the user management table 3t (step S32 of FIG. 9). When the unique ID is in the user management table 3t, the electronic signature validating process and the decryption process are performed on the stored e-mail that is related to the read-out record, and the processed e-mail is stored in the mail box 8 (step S33 of FIG. 9). Meanwhile, when the combination is not in the user management table 3t, the read-out record is deleted from the received e-mail management table 2t (step S34 of FIG. 9). Accordingly, even when a registration of a certain user is deleted after e-mails addressed to a plurality of users are received, the e-mails addressed to the users other than the certain user can be properly processed. Further, even when the user ID of the deleted user is allotted to a new user, the e-mails addressed to the deleted user that are received from the e-mail server apparatus 40 before such allotment will not be transmitted to the new user.

An example of the S/MIME gateway apparatus 20 has been described in the above preferred embodiment, however, the present invention is not limited to such an example, and may be applied to a communication terminal apparatus including a facsimile server apparatus, a telephone machine, a data communication apparatus, and a server apparatus, for example, that are connected to a Public Switched Telephone Network, a public digital line network, the Internet, or other similar networks.

In the above-described preferred embodiment, the mail box 8, the received e-mail management table memory 2, the user management table memory 3, and the unique ID memory 4 are provided in the hard disk drive 9, but may be provided in the RAM 7 composed of a flash memory, etc.

In the above-described preferred embodiment, the user management table 3t includes each combination of the user ID and the unique ID of the plurality of users, however, the present invention is not limited to such a configuration. The user management table 3t may include each combination of the identification information such as the user name, which is used to identify the plurality of users, and the unique ID. The received e-mail management table 2t includes the plurality of records each indicating the relation between each e-mail, and setting information and the unique ID of the destination user of the corresponding e-mail. In response to the registration deletion command with respect to a certain user, the main control unit 1 deletes the combination of the setting information and the unique ID of the certain user from the user management table 3*t*. Further, the main control unit 1 reads out each record of the received e-mail management table 3*t* and determines whether or not the unique ID of the user related to the read-out record is in the user management table 3*t*.

The received e-mail management table updating process of FIG. 8 is performed on the e-mails that are received from the e-mail server apparatus 40 through the POP 3, however, the present invention is not limited to such a configuration. The received e-mail management table updating process may be performed on the e-mails that are received from the client PC 30 through the SMTP. At this time, in steps S11 through S14 of FIG. 8, the e-mails from the client PC 30 are received via the SMTP, and in step S17, based on the transmission source address (which corresponds to "From address" and is identical to the user ID of the S/MIME gateway apparatus 20) received through a MAIL command of an SMTP protocol, the user management table 3*t* is referred to, and the user ID and the unique ID that are related to the selected e-mail are acquired.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. An e-mail receiving apparatus arranged to perform prescribed processes on e-mails that are received from an e-mail server apparatus and are addressed to a plurality of users, the e-mail receiving apparatus comprising:
    a control unit arranged to distribute the e-mails to the plurality of users by storing the processed e-mails in a mail box that is provided as a first storage unit with respect to each user; and
    a second storage unit arranged to store:
        a user management table arranged to include each combination of a unique ID, which is newly set each time a new user is registered in the e-mail receiving apparatus, and a user ID for each of the plurality of users; and
        a received e-mail management table arranged to include a plurality of records each indicating a relation between each e-mail, and the user ID and the unique ID of a destination user of the corresponding e-mail; wherein
    in response to a command ordering a deletion of a registration of a certain user, the control unit deletes e-mails addressed to the certain user from the first storage unit, and deletes the combination of the user ID and the unique ID of the certain user from the user management table; and
    the control unit sequentially reads out each record of the received e-mail management table, determines whether or not the unique ID of the user that is related to the read-out record is in the user management table, performs the prescribed processes on the stored e-mails that are related to the read-out record and stores the stored e-mails in the first storage unit when the unique ID is in the user management table, and deletes the read-out record and the corresponding e-mails from the received e-mail management table when the corresponding combination of the user ID and the unique ID is not in the user management table.

2. The e-mail receiving apparatus according to claim 1, wherein the e-mails that are received from the e-mail server apparatus are encrypted e-mails, and the prescribed processes include a decryption process in which the encrypted e-mails are decrypted into plain text e-mails.

3. The e-mail receiving apparatus according to claim 1, wherein each of the e-mails received from the e-mail server apparatus has an electronic signature, and the prescribed processes include a validating process in which the electronic signature is validated.

4. An e-mail receiving apparatus comprising:
    a central processing unit;
    an e-mail receiving device controlled by the central processing unit and arranged to receive e-mails addressed to a plurality of users from an e-mail server apparatus;
    a plurality of mail boxes arranged to store the e-mails addressed to each user;
    a user management table arranged to include each combination of a unique ID, which is newly set each time a new user is registered in the e-mail receiving apparatus, and a user ID for each of the plurality of users;
    a received e-mail management table arranged to include a plurality of records each indicating a relation between each of the received e-mails, and the user ID and the unique ID of a destination user of the corresponding e-mail;
    a deletion device controlled by the central processing unit and arranged to delete, in response to a command ordering a deletion of a registration of a certain user, the mail box in which the e-mails addressed to the certain user are stored, and to delete a combination of the user ID and the unique ID of the certain user from the user management table; and
    a distribution device controlled by the central processing unit and arranged to:
        sequentially read out each record of the received e-mail management table;
        determine whether or not the unique ID of the user related to the read-out record is in the user management table;
        perform the prescribed processes on the e-mails that are related to the read-out record when the unique ID is in the user management table;
        distribute the e-mails to the plurality of users by storing the processed e-mails in the mail box that is provided with respect to each user; and
        delete the read-out record and the e-mails from the received e-mail management table when the corresponding combination of the user ID and the unique ID is not in the user management table.

5. The e-mail receiving apparatus according to claim 4, wherein the e-mails received from the e-mail server apparatus are encrypted e-mails, and the prescribed processes include a decryption process in which the encrypted e-mails are decrypted into plain text e-mails.

6. The e-mail receiving apparatus according to claim 4, wherein each of the e-mails received from the e-mail server apparatus has an electronic signature, and the prescribed processes include a validating process in which the electronic signature is validated.

7. The e-mail receiving apparatus according to claim 4, wherein the e-mails received from the e-mail server apparatus are e-mails of Secure Multipurpose Internet Mail Extensions, and the prescribed processes include a decryption process of Secure Multipurpose Internet Mail Extensions.

8. The e-mail receiving apparatus according to claim 4, wherein the received e-mail management table is arranged to store actual data of the e-mail.

9. The e-mail receiving apparatus according to claim 4, wherein the received e-mail management table is arranged to store position information of the actual data of the e-mail.

10. The e-mail receiving apparatus according to claim 4, wherein the e-mail receiving device is arranged to receive e-mails through a Post Office Protocol Ver. 3.

11. The e-mail receiving apparatus according to claim 4, wherein the e-mail receiving device is arranged to receive e-mails through a Simple Mail Transfer Protocol.

* * * * *